United States Patent
Pratt et al.

[11] Patent Number: 5,937,265
[45] Date of Patent: Aug. 10, 1999

[54] TOOLING DIE INSERT AND RAPID METHOD FOR FABRICATING SAME

[75] Inventors: Steven D. Pratt; Sivakumar Muthuswamy, both of Plantation; Robert W. Pennisi, Ocean Ridge, all of Fla.

[73] Assignee: Motorola, Inc., Schaumburg, Ill.

[21] Appl. No.: 08/840,003

[22] Filed: Apr. 24, 1997

[51] Int. Cl.$^6$ ................................. B22F 3/12; B22F 3/14
[52] U.S. Cl. ................................. 419/6; 419/42; 419/49; 75/228; 75/240; 75/246
[58] Field of Search .................................. 419/6, 42, 49; 75/228, 240, 246

[56] References Cited

U.S. PATENT DOCUMENTS

| | | | |
|---|---|---|---|
| 4,535,831 | 8/1985 | Sato et al. | 164/33 |
| 4,726,412 | 2/1988 | Magnan et al. | 164/19 |
| 4,881,431 | 11/1989 | Bieneck | 76/108 R |
| 5,189,781 | 3/1993 | Weiss et al. | 29/527.2 |
| 5,301,415 | 4/1994 | Prinz et al. | 29/458 |
| 5,631,029 | 5/1997 | Bewaldy et al. | 425/78 |
| 5,679,445 | 10/1997 | Massa et al. | 428/212 |
| 5,779,401 | 7/1998 | Stallwitz et al. | 407/114 |

OTHER PUBLICATIONS

"Rapid Tooling Gains Switch Acceptance," by Joseph Ogando, *Plastics Technology*, Sep. 1995, pp. 51–53.
"Using Vapor Deposition in Forming Metallic Molds," Marshall Space Flight Center, Alabama, NASA Tech Briefs, Aug. 1996 No. 426, p. 86–.
"Rapid Prototyping Comes to Tool–Making," *Engineering News*.
"Isostatic Pressing: Stating the Art," *Tooling & Production* Reprint.
"Rapid Prototyping Report," CAD/CAM Publishing Inc., Jul. 1994, pp. 1–3.

*Primary Examiner*—Daniel J. Jenkins
*Attorney, Agent, or Firm*—Dale W. Dorincki

[57] ABSTRACT

A rapid method for fabricating a tooling die insert (71) is disclosed. A set of master parts (31, 32) in the shape of the insert is formed using stereolithography or other rapid prototyping techniques (106). The master parts are assembled and a flexible material is molded (109, 56, 57) in them to form a flexible mold (111, 61). The flexible mold is then filled (115) with metal powder and the powder is cold isostatically pressed (117) to solidify it and form a green part. The "green part" is then hot isostatically pressed (118) to form the densifyed tool.

14 Claims, 7 Drawing Sheets

TOOLING DIE INSERT AND RAPID METHOD FOR FABRICATING SAME

CROSS REFERENCE TO RELATED APPLICATIONS

This application is related to U.S. application filed concurrently herewith, entitled "Electrical Discharge Machining Electrode and Rapid Method for Fabricating Same," by Pratt, et al., and assigned to Motorola, Inc. now U.S. Pat. No. 5,818,005.

TECHNICAL FIELD

This invention is related to rapid tool manufacturing, particularly to tooling dies for injection molding and to a rapid process for manufacturing the same.

BACKGROUND

Conventionally, the fabrication of tooling die inserts requires highly skilled tool and mold makers using computer numerical control (CNC) machining and electrical discharge machining. Hence, a tooling die insert for a complex plastic part such as a radio housing can typically take several months and over one-hundred thousand dollars to fabricate using the conventional methods. In addition, tooling die insert detail is limited by machining constraints, therefore if intricate surface textures are desired in the end-molded product, they are added to the tooling die insert using time-consuming and labor intensive masking and etching processes. Finally, machined tooling dies are generally composed of one material having homogenous material properties throughout, and therefore the material is usually chosen as a trade-off of optimal mechanical strength, machinability, wear resistance and heat transfer capability.

Due to the market demand for reduced cycle time, several processes have been developed that fall under the guise of rapid tooling. The unifying factor of each of the various rapid tooling techniques is that they all utilize a rapid prototype (RP) pattern of some sort with a metal fabrication process to create a tooling die insert. Some rapid tooling methods have been developed based on the metal fabrication process of investment casting. Using an expendable pattern as a guide, investment casting creates a ceramic shell into which molten metal is poured to form the final part. 3D Systems, Inc. commercialized a technique known as Quick-Cast which uses a stereolithography master as the expendable RP pattern. Soligen Inc. uses an automated droplet deposition method to build the ceramic shell directly by selectively applying an adhesive to a powdered bed that forms each cross section into a composite-like material. Wax or plastic patterns produced by other RP systems, such as DTM Corp.'s Selective Laser Sintering, Stratasys's Fused Deposition Modeling and Sanders Prototype's ink-jet printing can also be used with the investment casting process for creating the ceramic shell. Each of these investment casting based techniques are an improvement over the conventional machined approach in regards to cycle time and cost. In addition, using the investment casting technique it is possible to incorporate conformal cooling channels directly into the tooling die insert as opposed to drilling the cooling channels. Drawbacks to the investment casting techniques include poor surface finish, geometry limitations of the ceramic shell and investment casting process, and extreme hardness of the cast tooling die inserts.

Other prior art rapid tooling methods are based on a 'metal shell' approach, in which a metal shell is first formed onto the rapid prototype pattern, removed, and reinforced to form a tooling die insert. U.S. Pat. Nos. 4,726,412 and 5,189,781 describe techniques for rapidly creating tooling die inserts by spraying metal onto a pattern. Cemcom Corp. is commercializing a process in which nickel is rapidly electroformed over an RP pattern. High strength ceramic is then used to bond the metal shell to a standardized pocketed mold base. The Marshall Space Flight Center has demonstrated the use of vacuum arc vapor deposition to apply the metal shell to the RP part. Each of these techniques allow for the production of a tooling die insert very rapidly and at low cost. However, the tooling die inserts produced by these methods generally have very poor thermal conductivity, are susceptible to rapid wear and hence short useful life, and have process related geometry limitations.

Powder metal based rapid tooling methods use varying techniques to form powdered metals and a binder into a tooling die insert 'green part', which is then placed in a furnace that removes the binder and sinters the powders together. Finally, the fused part is densified via infiltration with a low melting point metal such as copper. Keltool is a process developed by 3M Corp. which uses an RP pattern to make a silicone mold which is filled with finely powdered A6 tool steel, tungsten carbide and an epoxy binder which, after curing, forms the green part. DTM Corp. developed the RapidTool process which uses selective laser sintering to form the green part from low-carbon steel powder coated with proprietary additives and carried in a proprietary binder system. Three-dimensional printing, an RP technology invented by Emanual Sachs and Michael Cima of the Massachusetts Institute of Technology, uses electrostatic ink jets to selectively spray a colloidal acrylic binder onto stainless-steel powder to create the green part. Advantages of the powder metal based rapid tooling methods are speed, low cost, and the ability to create complex geometry and incorporate conformal cooling channels into the tooling die inserts. Disadvantages include poor surface finish and warpage due to sintering and infiltration.

Although the rapid tooling technologies have reduced the cycle time from several months to a few weeks, a need still exists for an even faster process for creating tooling die inserts that reduces the cycle time down to one or two days. The new process should be able to create tooling die inserts having complex geometry with mechanical properties able to withstand the pressures and temperatures of the injection molding process. The new process should also be able to incorporate conformal cooling channels and integral surface texture. Further, the new process should allow for multiple materials to be utilized to optimize various portions of the tooling die insert; i.e., high wear material at the cavity surfaces and high thermally conductive material about the cooling channels.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward. In the following discussion, the term 'insert geometry' refers to that portion of a tooling die insert containing the desired shape to be molded and the parting surface, and the term 'base geometry' refers to the remaining geometry of a tooling die insert which is used for mounting and aligning the insert in a mold base assembly.

Figure 1:
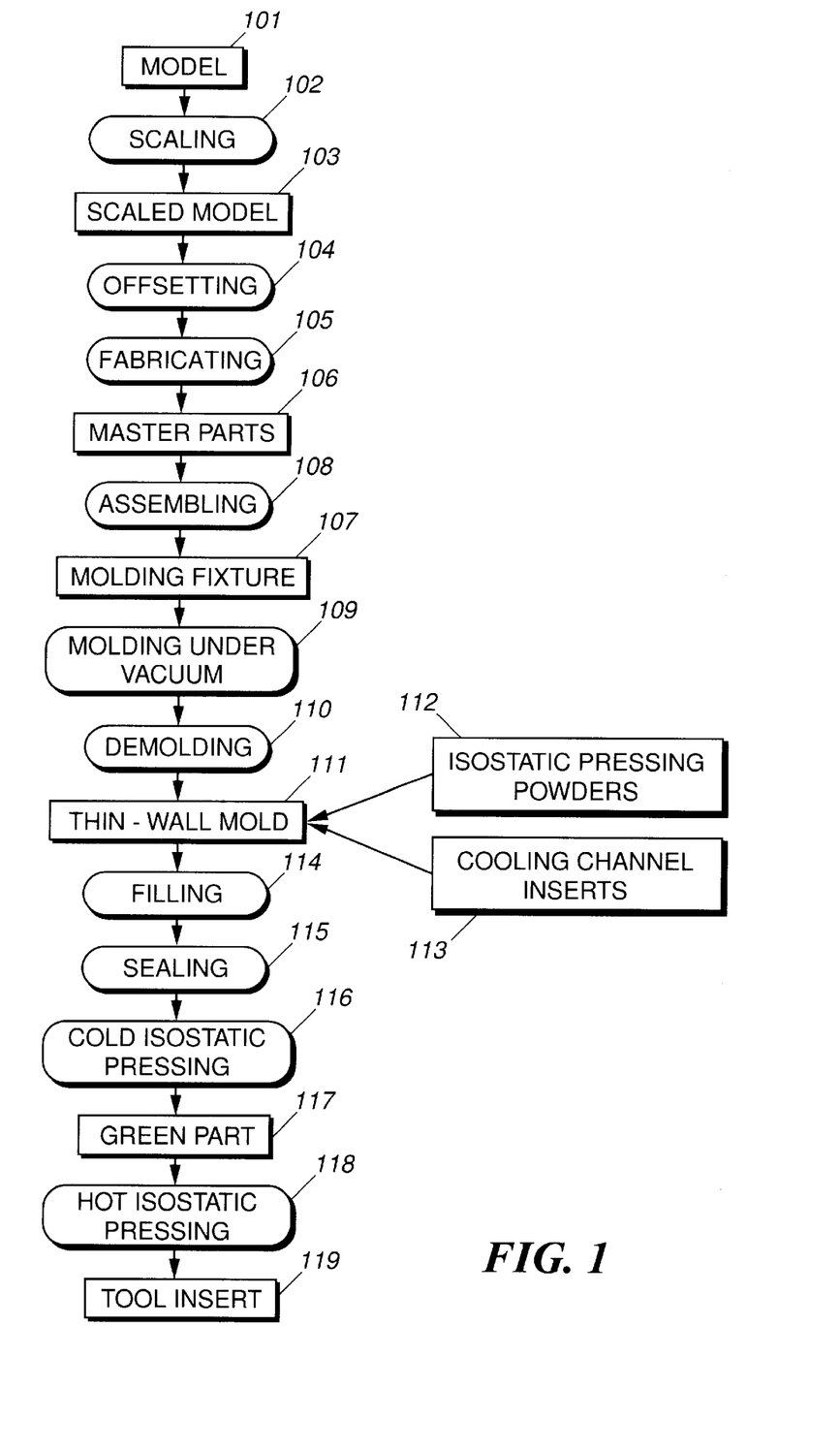
FIG. 1 is a process flow diagram in accordance with the invention.

The method of forming the tooling die insert involves fabricating a thin-walled flexible mold having a uniform wall thickness, filling the mold with metal powders, cold isostatic pressing the powders in the flexible mold, and finally compacting the tooling die insert using hot isostatic pressing. FIG. 1 shows a typical flow chart used to make a tooling die insert in accordance with the instant invention, where the rectangular boxes represent structural entities in the process, and boxes with rounded corners represent process steps to achieve the various structural entities. Referring now to FIG. 1, a CAD model 101 of the insert geometry is scaled 102 to account for uniform shrinkage that occurs during the downstream isostatic pressing processes 116 and 118. The magnitude of scaling is determined for a given mixture of isostatic pressing powders 112 either through experimentation or calculated using theoretical equations as known in the isostatic pressing art. The external surfaces of the scaled CAD model 103 are offset 104 in a direction normal to the surfaces a distance equal to the desired wall thickness of the thin-wall mold 111. Collectively, the external surfaces of the scaled CAD model and the offset surfaces form an enclosed volume of uniform thickness, said volume having the desired shape of a thin-wall mold for cold isostatic pressing the insert geometry. Rapid, automated fabrication techniques 105 such as "multi-jet modeling" (commercially available from 3D Systems) are then used to create a pair of master parts 106, one master part having a portion of which contains the surface geometry of the external surfaces of the scaled CAD model, and the other master part having a portion of which contains the surface geometry of the offset surfaces. The master parts are assembled 108 with other parts to create a molding fixture 107, said molding fixture forming an enclosed volume of uniform thickness which has the desired shape of a thin-wall mold for cold isostatic pressing the base geometry. The master parts are mounted in the molding fixture such that together with the molding fixture they define an enclosed volume of uniform thickness having the desired shape of a thin-wall mold for cold isostatic pressing of tooling die insert having an insert geometry and a base geometry. A vacuum is pulled from one end of the enclosed volume while concurrently an elastic, rubbery molding compound such as "RTV-J" silicone rubber (commercially available from Dow Corning Co.) is injected into the opposite end of the enclosed volume in order to mold 109 a flexible form in the desired shape of the thin-wall mold. After curing at room temperature, the master parts and molding fixture are demolded 110 to liberate the thin-wall mold 111.

Next, one or more metal powders 112 suitable for the isostatic pressing process, such as irregularly shaped steel, iron, copper and aluminum powders are prepared using blending techniques known in the powder metallurgy art. Optional cooling channel inserts 113, comprised of a compressible material, are assembled into the thin-wall mold. The thin-wall mold is then filled 114 with the isostatic pressing powders. Care is taken during the filling of the mold to eliminate segregation of the different powders. Vibration can also be used during the filling stage to assist in obtaining a high fill density. The filled mold is then sealed 115 and transferred to a pressure vessel to be cold isostatically pressed 116, a process in which high pressure is applied by pumping a fluid into the vessel. After pressing, the green part 117 is removed from the mold, the cooling channel inserts are dissolved using an adequate solvent, and the green part is ready for final compaction. Multiple green parts can thus be rapidly fabricated by repeatedly filling the thin-wall mold, sealing the mold and performing the cold isostatic pressing. Once the desired number of green parts is obtained, they can be hot isostatically compressed 118 to form a hard tool, singly or in a batch. The resulting tool inserts 119 are ready to be post-processed and assembled into a mold base for use.

Figure 2:
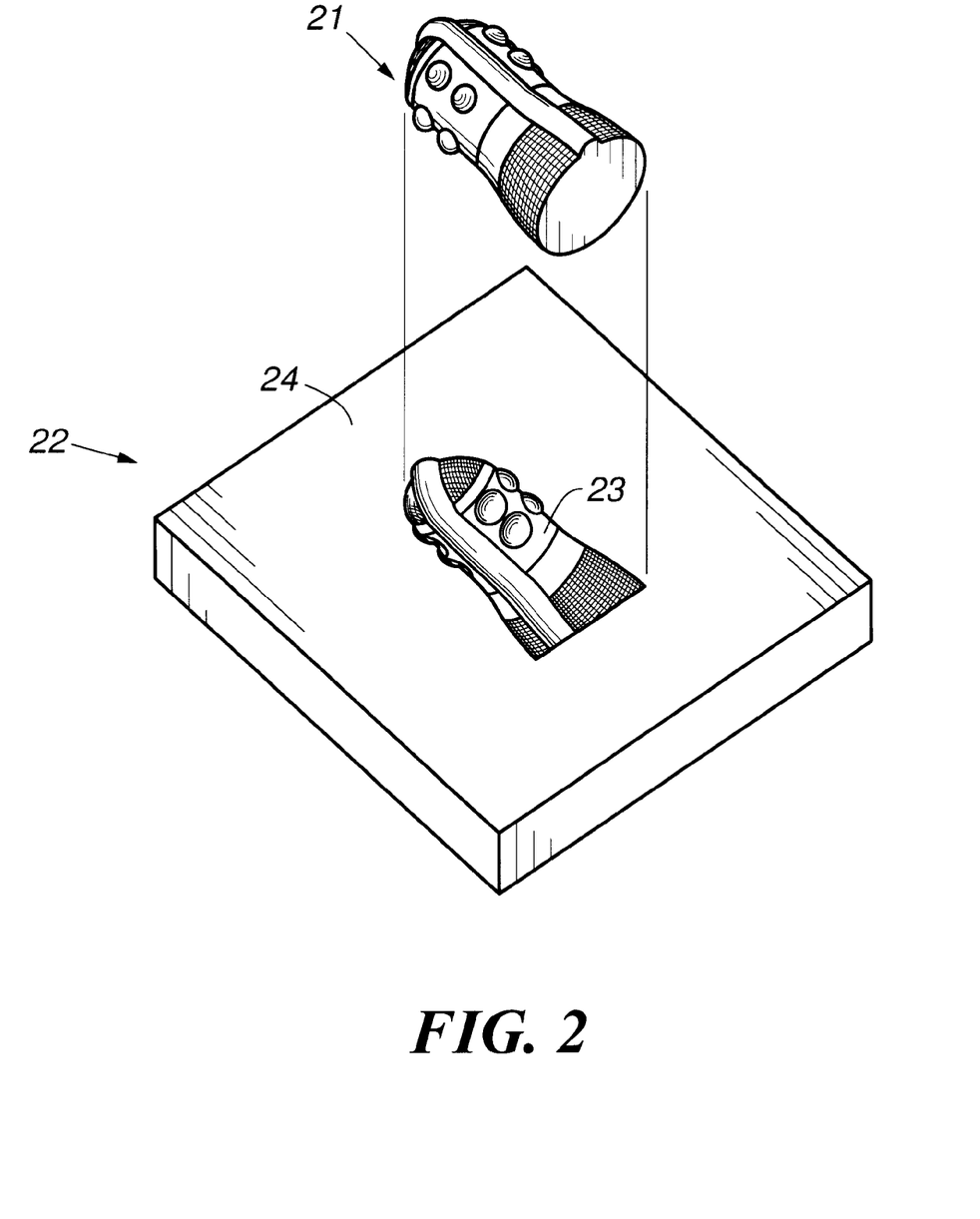
FIG. 2 is an isometric view of a part to be made from the tooling die insert, and a CAD model of the tooling die insert for the part.

Having explained our process to rapidly fabricate a tooling die insert, we now turn to a detailed description of the various structural entities in the process. FIG. 2 is a representative example of the type of tooling die insert to be fabricated as described above. The end product 21 (for example, a knob for a two-way radio) to be formed by, for example, injection molding is shown along with a CAD model of one of the two tooling die inserts 22 necessary to mold this product. The CAD model of the tooling die insert includes a collection of complex surfaces 23 corresponding to one half of the shape of the article to be formed by injection molding, and a planar surface 24. The planar surface is known in the art as the parting surface, and it defines the mating surface between the two tooling die inserts that together form the cavity for molding the entire article. Together, the surfaces 23 and 24 comprise the insert geometry The CAD model is scaled (made bigger) to compensate for shrinkage that occurs during the consolidation and compaction of the powder during the isostatic pressing processes. The percentage of scaling necessary, S, can be calculated with the equation:

$$S = 100\left(\frac{1}{\sqrt[3]{\frac{\rho_O}{\rho_F}}} - 1\right)$$

where $\rho_O$=tap density of the powder, and $\rho_F$=final density.

Tap density represents the density of a powder obtained through vibration. It is the highest packing density possible for a powder without the application of pressure. The final density is the powder density after hot isostatic compaction, and is usually equal to the theoretical density of the material. These values can be obtained for the various powders through experimentation or from the powder vendors. The above equation is useful as a good estimation of the dimensional scaling needed. If a finished tool insert prepared according to the process of the present invention exhibits unacceptable dimensional change (e.g. shrinkage), then the dimensions of the CAD model can be further adjusted.

Figure 3:
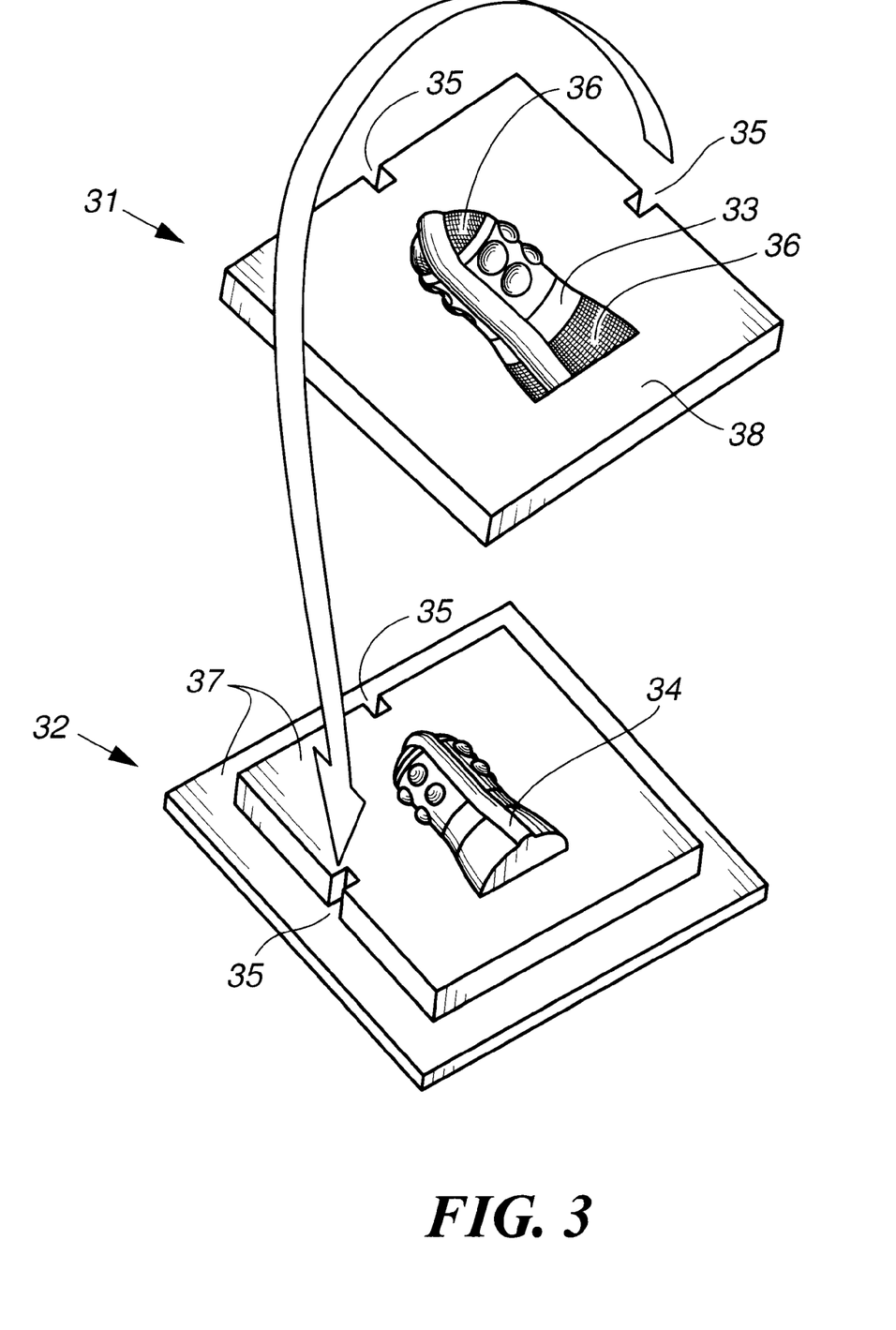
FIG. 3 is an exploded isometric view of a CAD model of two master parts.

The scaled CAD model is then used to design a set of master parts. FIG. 3 shows the pair of master parts for the CAD model of FIG. 2. The first master part 31 is designed by merging the CAD model with a base 38 which fits into the molding fixture. The second master part 32 is designed by offsetting the insert surface 33 of the first master part by a predetermined distance that is normal to the respective surfaces of the scaled CAD model, followed by merging the offset surfaces with a second base 37. This results in the second master part having a protruding surface 34, such that when the first and second master parts 31, 32 are assembled into the molding fixture the surfaces 33 and 34 collectively define a cavity of pre-determined thickness. The master parts may optionally include alignment and registration features 35 to assist assembly in the subsequent mold fixture.

Having now created a CAD model of the master parts, in the preferred embodiment the master parts are fabricated using an automated, rapid fabrication process such as one of the many commercially available free-form rapid prototyping processes, including stereolithography, ink-jet printing, fused-deposition modeling, laser sintering, laminated object manufacturing, etc. Speed and accuracy are the main concerns when selecting a process for fabricating the master parts. Two suitable manufacturing processes are "multi-jet modeling" (commercially available from 3D Systems) and "ink-jet printing" (commercially available from Sanders Prototype). Other forming and machining means of fabricating the master parts such as carving, machining, lost wax casting, etc. can be used and still fall within the scope and spirit of this invention. The master parts can be made from wood, plastic, metal, wax, paper or other processable materials.

Often, it is desirable to apply texture to certain areas of tooling die inserts to result in that texture being part of the final molded article. Traditionally this texturing process is labor intensive and expensive, accomplished by first tediously masking the areas of the tooling die inserts not to be textured, followed by texturing via an etching process. In the present invention, this texture can be more easily applied to the master parts prior to fabrication of the thin-wall mold. Texture 36 has been applied to the master part in FIG. 3. Texturing the master parts can be accomplished via painting, etching, engraving, hot pressing, or other techniques depending on the composition of the master part. To better facilitate texturing, the master part can be composed of separate pieces that are later adhered together rather than one piece. Alternatively, the texturing can be added in the CAD model in step 101, and simply carried throughout the process.

Figure 4:
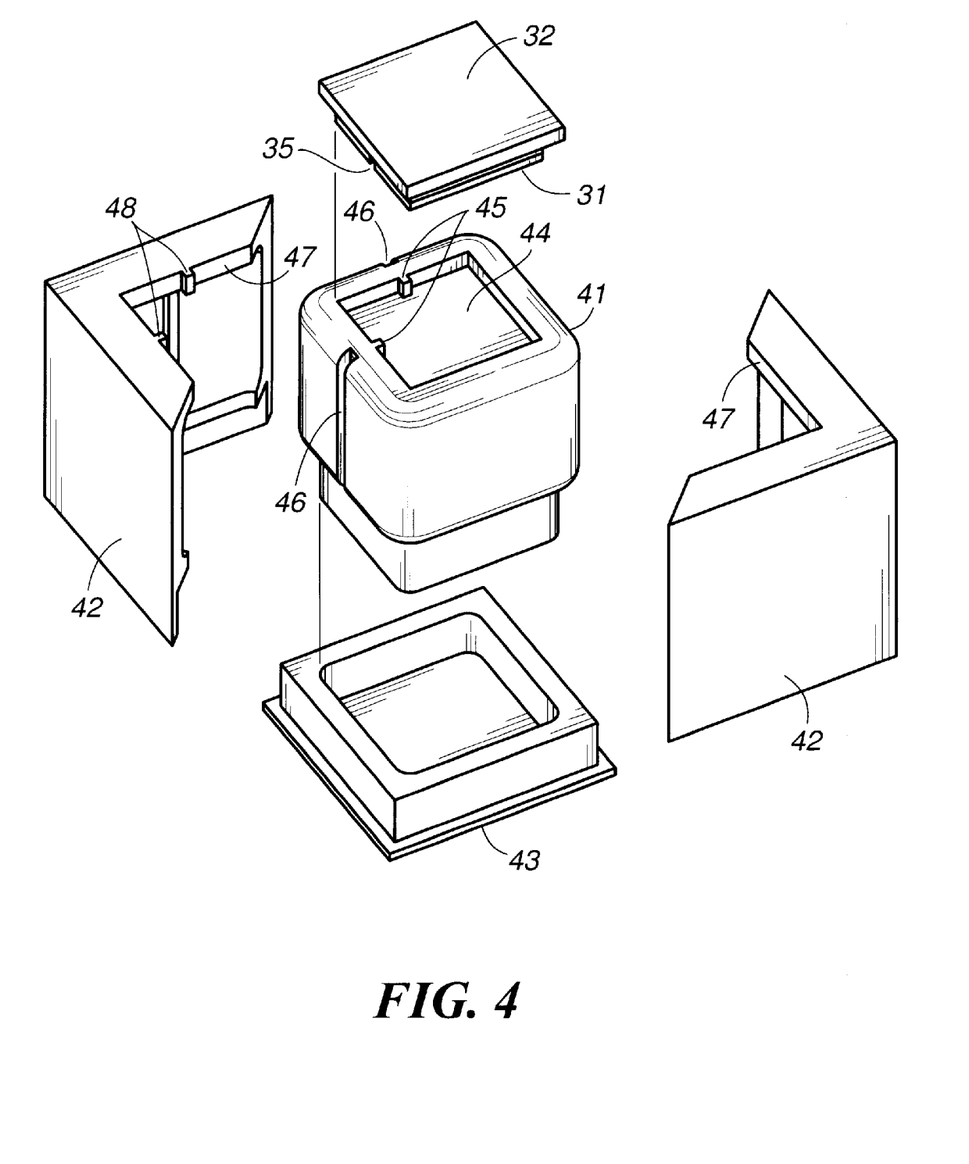
FIG. 4 is an exploded isometric view of a mold assembly for forming a flexible mold.

The master parts are designed to fit into a molding fixture. FIG. 4 shows one such molding fixture composed of a mandrel 41, side walls 42, and a base 43. The mandrel contains a depressed portion 44 into which the first master part 31 is assembled. Registration features 45 mate with corresponding mating features 35 to assist in aligning the first master part. On the external surfaces of the mandrel 41 are slot features 46 which form internal ribs on the thin-wall mold. These ribs, in turn, form slot features on the finished tooling die insert, which are used to orient and align the tooling die insert in, for example, an injection mold base assembly. The side walls contain surfaces 47 which mate with the second master part. Registration features 48 mate with corresponding mating features (35, not shown) to assist in aligning the second master part. Multiple molding fixtures can be created for creating tool inserts of varying aspect ratios, as well as tool inserts of varying material composition.

Figure 5:
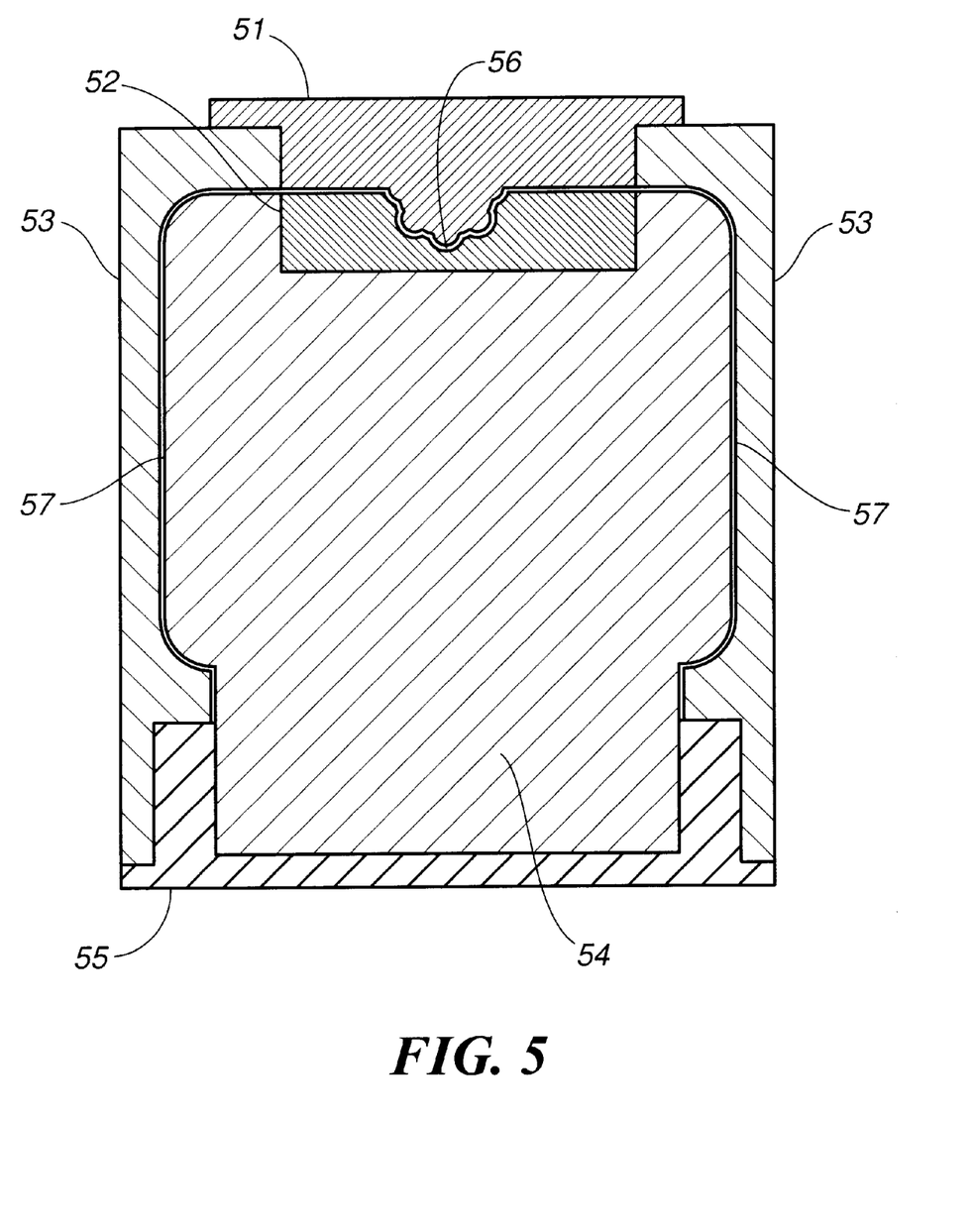
FIG. 5 is a full sectional view of the assembled mold of FIG. 4.

When assembled, the mold fixture including master parts is used to create the thin-wall mold. FIG. 5 displays a cross-sectional view of the assembled mold fixture and master parts. Master parts 31 and 32 combine to form an enclosed volume 56 of uniform thickness, said volume forming a portion of a thin-wall mold for isostatically pressing the insert geometry. Side walls 42, mandrel 41, and base 43 combine to form an enclosed volume 57 of uniform thickness, said volume forming the portion of a thin-wall mold for isostatically pressing the base geometry. In practice, the mold fixture assembly is used to form a thin-wall mold by injecting a molding compound into the evacuated enclosed volume 57 at one or more points (not shown).

The molding compounds which can be used to prepare the thin-wall mold in the process of this invention are those which cure to an elastic or flexible rubbery form and generally have a Shore A durometer value of about 30–80, and reproduce the fine details of the master parts to an acceptable degree of accuracy. To maintain dimensional control, it is preferred that the molding compounds are curable silicone rubbers and urethane resins having little (less than 0.5%) or no post cure shrinkage. Other methods and materials to form a thin-wall mold compatible with the isostatic pressing process will be known to those skilled in the art, such as but not limited to hydroforming, vacuum forming, stamping and blow molding of plastics, sheet metals, foams etc., and may be used without diverging from the spirit of this invention. Any of these techniques that provide a mold that is flexible enough to deform under pressures in excess of 10 MPa (megaPascals) are considered to be 'flexible'.

Figure 6:
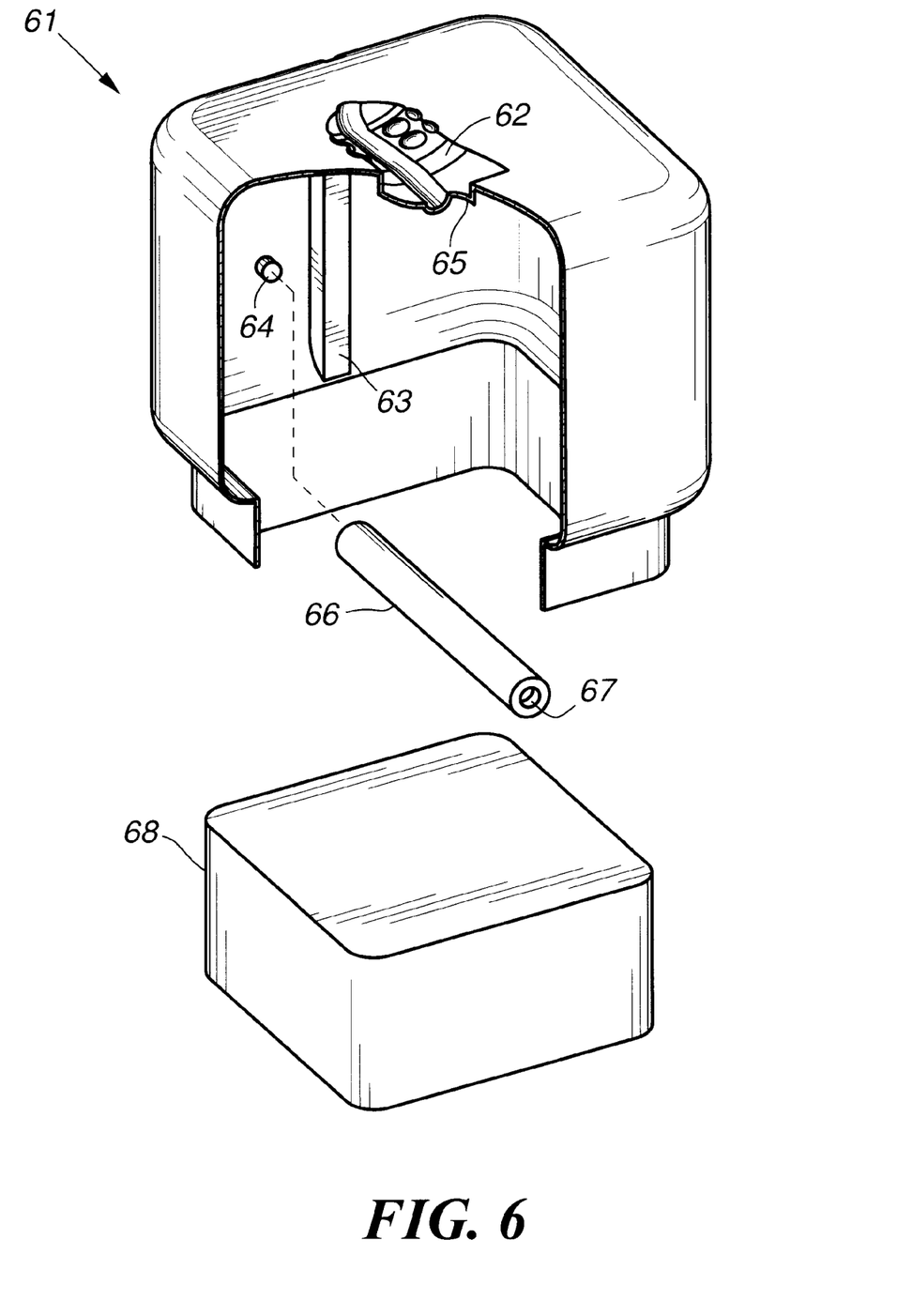
FIG. 6 is a cut-away isometric view of the thin wall mold produced from the mold shown in FIG. 4, including a cooling channel insert.

FIG. 6 displays the thin-wall mold 61 formed from the molding fixture assembly of FIG. 5. The thin-wall mold contains surface features 62 for isostatically pressing the insert geometry. Internally, protruding rib features 63 are used for forming registration and alignment slots on the pressed tool inserts. Cooling channel inserts 66 are optionally assembled into the flexible tool by aligning depression features 67 with corresponding protrusion features 64 on the thin-wall mold. The cooling channel inserts can be composed of closed cell foams, urethanes, plastics and other suitable compressible materials that can be dissolved in a solvent. In the preferred embodiment, the cooling channel inserts are polystyrene foam and the solvent is acetone. The geometry of the cooling channels can be tailored to control the amount of cooling that occurs throughout the tooling die insert during use. Texture 65 (not visible in figure) has been accurately reproduced on the interior surface. Plug 68 is used to seal the mold after filling.

Powders useful for fabricating the tool inserts of this invention include 316L-325 mesh stainless steel powder, A131-325 mesh iron powder and 200RLX-HGS copper friction powder (all commercially available from SCM Metals). Typical powder geometries that work well with the isostatic pressing process include rounded, irregular, fibrous, flake, polygonal, dendritic and aggregate. High packing density can be obtained by mixing graded particle sizes that are significantly different and the mixture composition optimized. For example, two particles with a size ratio of 7:1 can be homogeneously mixed to a high packing density using a weight percent composition of 73:27. In optimal packing, the largest particles form a fixed skeleton so that successively smaller particles fill the remaining voids. During the filling process, separate powder mixes can be employed to stratify the composition of the tool insert. For example, material with high wear characteristics such as steel can be located at the insert surface, where wear is of concern, and the remainder of the tool insert could be composed of material having optimum heat transfer properties, such as a powder mixture high in copper content. In stratifying the material, however, it is important that each powder composition has a like packing density to ensure uniform shrinkage.

After the thin wall flexible mold 61 is filled as in step 115, it is capped or sealed in step 116 by inserting the plug 68 and sealing with tape or other means. The mold is placed into the pressure vessel and isostatically pressed. The technique of isostatic pressing is well known, and involves hydraulically pressing the exterior of the flexible mold under high pressures to uniformly compact the powder into a solid mass. Cold isostatic pressing typically occurs at room temperature, and although this is the preferred embodiment, one may also choose to employ warm isostatic pressing, which is at a somewhat elevated temperature. The isostatic pressing step typically takes less than five minutes, then the seal is removed from the mold, the green part is extracted, and the cooling channels dissolved in a suitable solvent. Reference to the part as a 'green' part is similar to that used in the ceramics industry, in that the part, although solid, is not completely hardened and needs additional processing to bring it to the completed stage. Since the flexible thin wall rubber mold 61 can be reused, multiple green parts can be easily created in a short time by repeatedly pressing powders in this manner.

Next, the green parts are placed in a pressure vessel and hot isostatically pressed to density and harden the tooling die insert. In the hot isostatic pressing process, the green parts are simultaneously compacted and sintered. Because of high pressures, full theoretical density of the material is attained. Porosity is completely eliminated, and there are no striations or cracks.

Figures 7, 8:
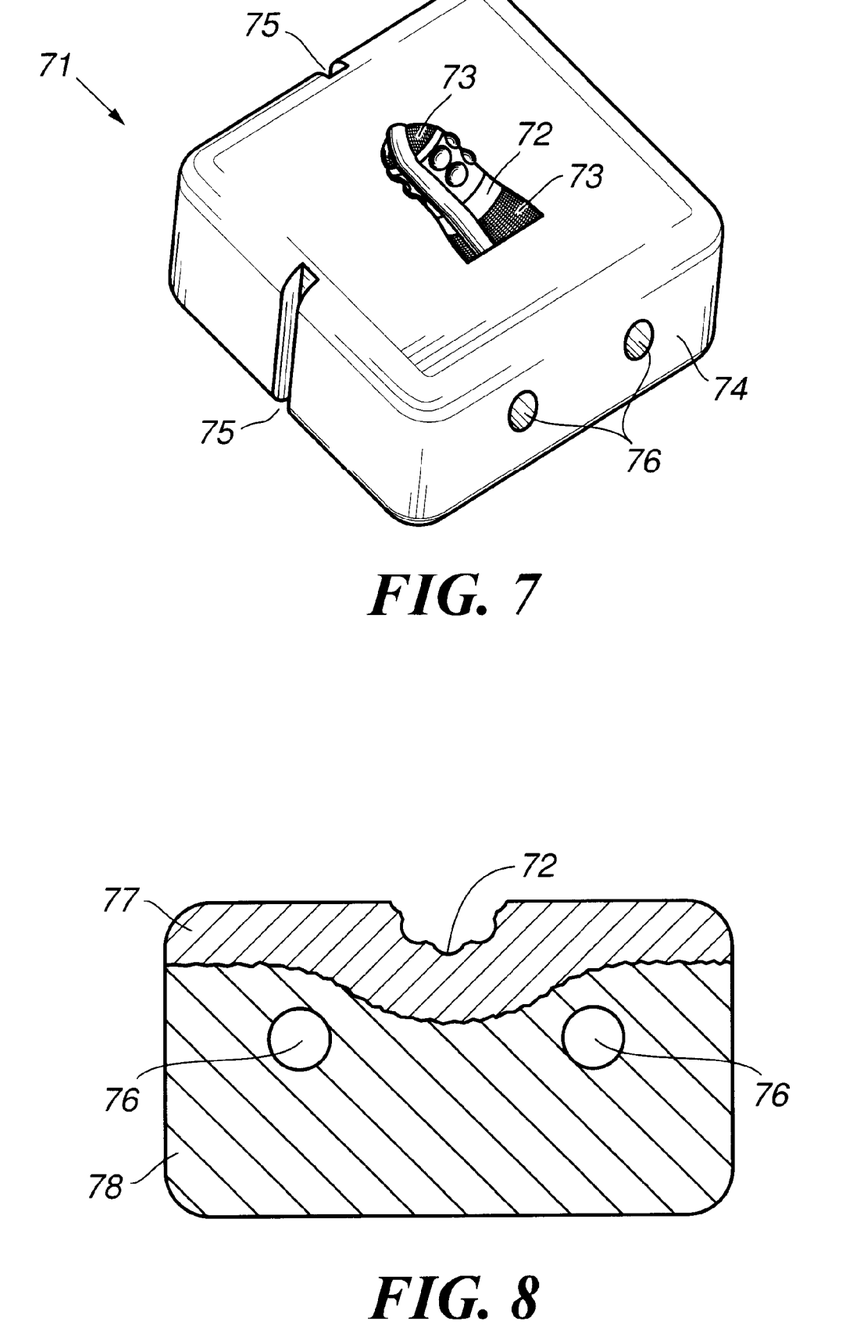
FIG. 7 is an isometric view of an tooling die insert fabricated in accordance with the invention.
FIG. 8 is a cross-sectional view of the tooling die insert of FIG. 7.

FIG. 7 shows a tooling die insert 71 produced using the process of the present invention. The tooling die insert contains insert geometry 72 corresponding to the desired shape to be molded. Texture 73 is located on surfaces corresponding to areas of the finished article where texture is desired. The base geometry 74 includes slots 75 which are used to align and register the tooling die insert in the mold base assembly. During use, cooling channels 76 are used to flow coolant into and out of the tooling die insert.

A cross-sectional view in FIG. 8 shows two distinct regions of material composition. The top region 77, closest to the insert geometry surface, is composed of a material having high wear characteristics, such as stainless steel. Lower region 78, around the cooling channels, is composed of a material having high thermal conductivity, such as a material with a high copper content. Moving components could have a high graphite content for self lubrication properties. In this way, the tooling die inserts of the present invention can be custom tailored to optimize molding performance characteristics. Some materials suitable for a multiple region tooling die insert are stainless steel, copper, graphite, aluminum, iron, bronze, nickel, and tungsten carbide. In use, the tooling die inserts for forming a molded article are assembled into a mold base. The mold base is in turn assembled into a molding press. Molten material such as thermoplastic is injected under pressure into the cavity created by the tooling die inserts, the material is allowed to cool and solidify, and the mold is opened, allowing for the removal of the molded article.

In summary, a rapid process for fabricating a tooling die insert has been described. The process utilizes some conventional technologies from diverse industries in a novel manner and combination to enable multiple tooling die inserts to be made from a single flexible mold tool using cold isostatic pressing of metal powders, followed by hot isostatic pressing. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A rapid method for fabricating a tooling die insert, comprising:

fabricating a flexible mold that represents the tooling die insert;

filling the flexible mold with a metal powder;

cold isostatically pressing the filled mold to compact the metal powder and form a green tooling die insert; and hot isostatically pressing the green tooling die insert to densify and harden it.

2. The method as described in claim 1, wherein the tooling die insert is a portion of an injection mold for high pressure injection molding plastic.

3. The method as described in claim 1, wherein the step of fabricating a flexible mold comprises vacuum molding an elastomeric material.

4. The method as described in claim 1, wherein the step of fabricating a flexible mold comprises fabricating a thin wall metal mold that is deformable under pressure greater than 10 MPa.

5. The method as described in claim 1, further comprising a step, prior to the step of hot isostatically pressing, of removing the green tooling die insert from the flexible mold.

6. A rapid method for fabricating a tooling die insert, comprising:

fabricating master parts that represent the tooling die insert using a rapid prototyping technique;

fabricating a flexible mold from the master parts;

filling the flexible mold with a metal powder;

cold isostatically pressing the filled mold to compact the metal powder and form a green tooling die insert; and hot isostatically pressing the green tooling die insert to densify and harden it.

7. The method as described in claim 6, wherein the step of fabricating a master part comprises fabricating a master part using stereolithography, ink-jet printing, fused-deposition modeling, laser sintering, or laminated object manufacturing.

8. The method as described in claim 6, further comprising a step of creating a computer model of the tooling die insert prior to the step of fabricating master parts.

9. The method as described in claim 6, further comprising a step of adding texturing to the master parts, prior to the step of fabricating a flexible mold.

10. A rapid method for fabricating a tooling die insert, comprising the following steps in the order named:

a) creating a computer model of the tooling die insert;

b) scaling the computer model to allow for shrinkage;

c) offsetting a portion of the scaled computer model in a direction normal to respective surfaces of the scaled model;

d) fabricating master parts using the models made in steps (b) and (c) by a rapid prototyping technique;

e) molding a flexible elastomer in the master parts to form a flexible mold;

f) filling the flexible mold with an metal powder;

g) cold isostatically pressing the metal powder filled mold of step (f) to form a green tooling die insert;

h) removing the green tooling die insert from the flexible mold; and i) hot isostatically pressing the green tooling die insert to densify and harden it.

11. A precision tooling die insert, comprising a pressed powder tooling die insert fabricated by cold isostatically pressing a filled mold to compact metal powder followed by hot isostatically pressing the compacted metal powder so as to form a densified tooling die insert.

12. The precision tooling die insert as described in claim 11, further comprising a cooling channel.

13. The precision tooling die insert as described in claim 11, wherein the insert is monolithic and contains two or more regions, each region having a different material composition.

14. The precision tooling die insert as described in claim 11, wherein the materials are selected from the group consisting of stainless steel, copper, graphite, aluminum, iron, bronze, nickel, and tungsten carbide.

* * * * *